May 29, 1951 F. HEUSER 2,554,702
SPRAYING APPARATUS
Filed April 11, 1945 2 Sheets-Sheet 1

INVENTOR
FRED HEUSER
BY
Bean, Brooks, Buckley & Bean. ATTORNEYS

May 29, 1951 F. HEUSER 2,554,702
SPRAYING APPARATUS
Filed April 11, 1945 2 Sheets-Sheet 2
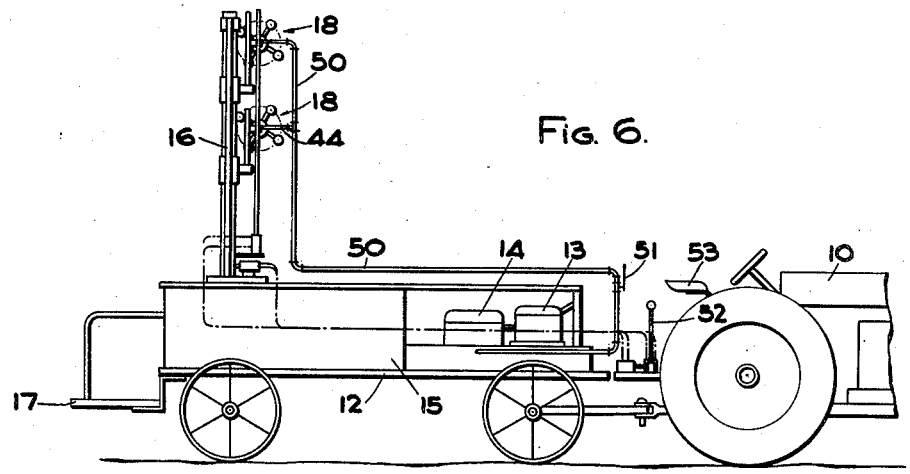
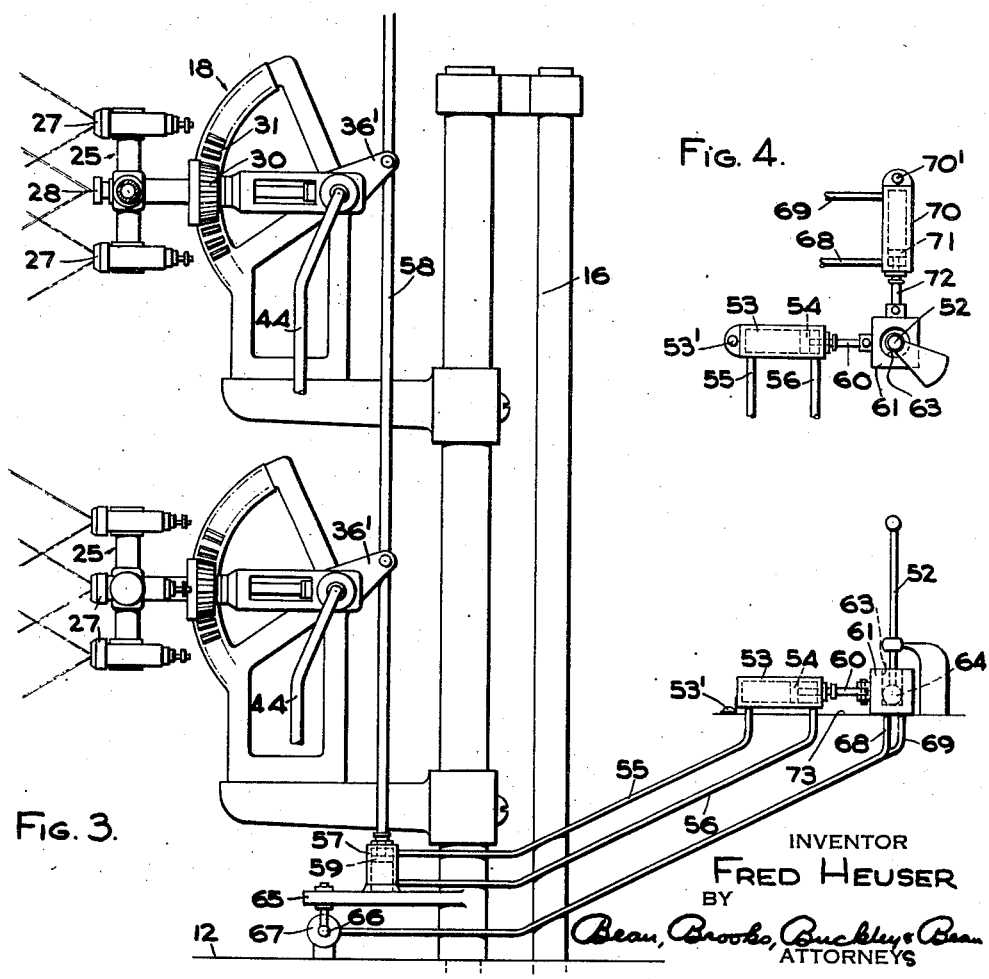
INVENTOR
FRED HEUSER
BY
Bean, Brooks, Buckley & Bean
ATTORNEYS Patented May 29, 1951

2,554,702

UNITED STATES PATENT OFFICE 2,554,702

SPRAYING APPARATUS

Fred Heuser, Gasport, N. Y.

Application April 11, 1945, Serial No. 587,687

5 Claims. (Cl. 299—37)

This invention relates to a sprayer and more particularly to a sprayer adapted for spraying trees for the control or riddance of insects and pests. Mechanical sprayers have been heretofore provided for automatically moving the spray nozzle back and forth for enlarging the field of spray coverage, and while such machines are effective to a certain extent, nevertheless they have failed somewhat in reaching much of the inner branches and foliage, especially when the trees have a dense foliage.

The primary object of the present invention is to provide a highly efficient sprayer which is far more effective and thorough in its spray application.

A further object of the invention is to provide a sprayer by which the liquid spray as directed onto the tree will be given a whirling action for penetrating the tree foliage and branches more thoroughly and more completely.

A further object of the invention is to provide a spraying apparatus embodying a degree of flexibility which enables the driver of the towing tractor readily maintaining directional control of the spray equipment located on the trailer body.

A further object of the invention is to provide a nozzle having a valve seat so constructed that it will effectively shut off the flow of liquid when closed, thereby avoiding dripping of fluid from the nozzle.

In the drawings:

Fig. 3 is a reduced elevational view of a modified form of the device;

Fig. 4 is a fragmentary plan view of the control means of Fig. 3;

Fig. 6 is a side elevational view, somewhat in diagram, of the tractor and trailer arrangement.

Figure 2:
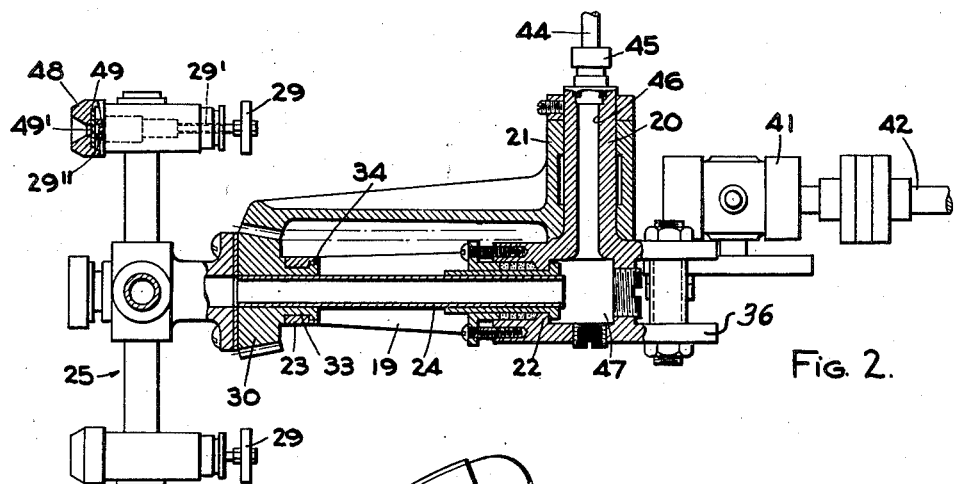
Fig. 2 is a fragmentary sectional plan view thereof.
Figure 1:
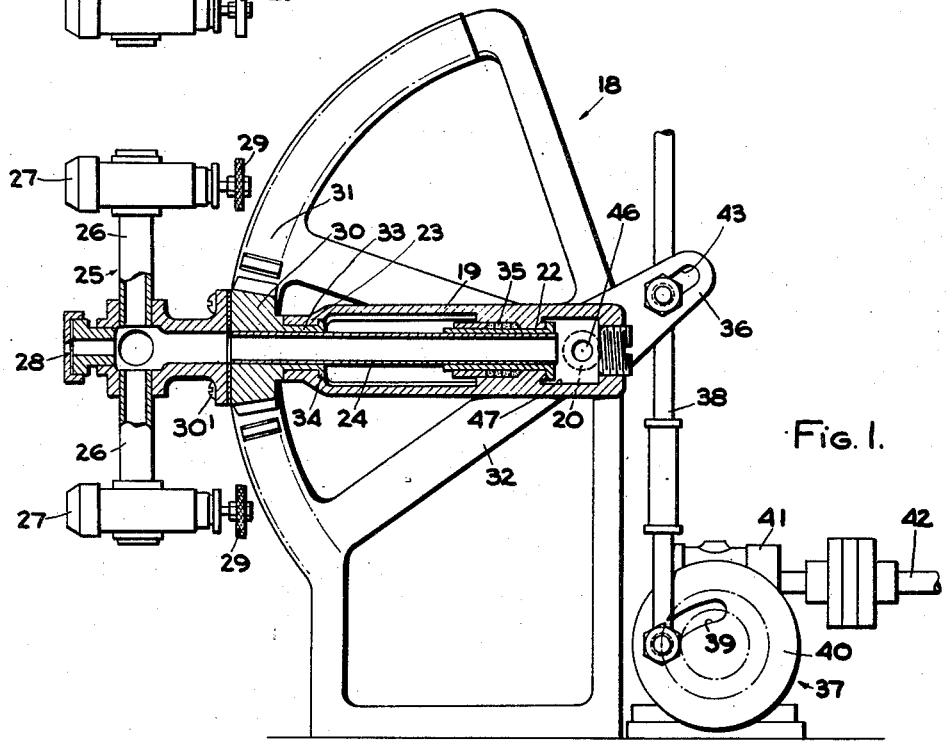
Fig. 1 is a side elevation of the preferred form of my invention.

Referring more particularly to the drawings, the numeral 10 designates a tractor having coupled thereto a trailer 12 provided with spray equipment comprising a motor or gas engine 13 preferably independent of the tractor engine for operating a compressor 14, and a tank 15 in which the disinfectant or other spray liquid is contained. A tower 16 is mounted adjacent the rear end of the trailer on which latter is arranged a platform 17 to be occupied by an attendant. On the spray tower 16 are mounted one or more sprayer units 18. As illustrated in Figs. 1 and 2, each unit comprises a sprayer arm 19 having a laterally extending shaft 20 journaled in a bearing 21 in the tower frame. The arm 19 is formed with spaced bearings 22 and 23. A pinion 30, provided with a bearing portion 33, is rotatably mounted in the bearing 23, and the tubular shank 24 of the sprayer head 25 is rotatably mounted in the bearing 22. One end of the shank is disposed within the pinion 30 in fluid tight manner and rotates with the pinion, a suitable stuffing box 35 being provided for the shank at the bearing 22. The sprayer head 25 is secured directly to the pinion 30 by suitable means 30'. The bearing portion 33 of the pinion is preferably held against axial movement by means of a collar 34 formed thereon.

The head 25 is provided with laterally extending sprayer arms 26 each of which carries a nozzle 27. A centrally arranged nozzle 28 is also carried by the head. These nozzles may be of any desired type, the central nozzle 28 herein illustrated being preferably of the fog type, while the nozzles 27 are preferably of the adjustable type, adjustment being effected in a suitable manner as by the control valve 29. The sprayer head 25 together with the pinion 30 and shank are journaled in the tubular arm 19 for rotary movement about the axis of the head, and this rotary movement of the sprayer head 25 with respect to the sprayer arm 19 is preferably imparted while the arm itself is being oscillated about the axis of its laterally extending shaft 20. This is readily accomplished by providing a quadrant shaped rack 31. This rack may be formed as a part of a supporting frame 32 which carries the bearing 21 for the shaft 20 and which is fixedly mounted on the tower 16. Consequently, as the spray unit is oscillated about the horizontal axis of shaft 20, the rack 31 will impart a rotary motion to the pinion 30 and the sprayer head 25. This oscillation of the arm about the axis of shaft 20 may be accomplished mechanically by connecting the rocker arm 36 to a rotating crank 37 by means of a link 38. The throw of the crank 37 may be varied by adjusting the crank pin in a slot 39 formed in the crank plate 40. The crank is rotated at the desired speed through a transmission 41 which may be driven by a shaft 42 suitably connected to the source of power 13. Further adjustment of the oscillating movement of arm 19 may be secured by providing a slot 43 in the rocker arm 36 for adjustably varying the point of connection of link 38 therewith.

The spray liquid is conveyed under pressure to the sprayer unit by means of a hose or conduit 44 leading to a swivel coupling 45 and into the passage 46 formed in the shaft 20 which opens into a chamber 47 formed in the inner end of the sprayer arm. The inner end of the shank 24 opens into this chamber, whereby fluid under pressure is conducted to the sprayer head 25. The conduits 44 are connected to a fluid line 50 receiving sprayer fluid under pressure from the tank 15, and a suitable valve 51 is located in the line 50 at a point accessible to the operator of the tractor 10.

The head 25 of each sprayer unit may be easily detached from the pinion 30 and arm 19, and replaced by one of different size or style. Each nozzle 27 has a removable cap 48 holding a disk 49 on which the valve seats over an orifice 49'. The control valve 29 is threaded in the nozzle casing, as at 29', and formed with a cupped end 29'' which provides a ring contact with the seat forming disk 49 when the valve is seated, the disk being given substantial support by the heavier cap 48. This cupped valve more effectively seals off the liquid against the lodgment of foreign matter on the seat.

In lieu of automatically actuating the nozzle up and down by power, the same may be manually so actuated by an attendant standing on the platform 17 by first disconnecting the power link 38 and then suitably rocking the rocker arm 36. By this arrangement, the arm 19 may be moved up and down so that the pinion in traversing the rack will rotate the sprayer head for producing the whirling spray.

Where it is desired to place this manual operation under the control of the driver of the tractor, this may be accomplished by means of a control system of the push-pull type. This may comprise a control lever 52 accessible to the operator of the tractor, the lever being connected by suitable fluid transmission to so actuate the nozzle up and down over the rack for obtaining the whirling spray. In Fig. 3, there is shown such a system comprising a cylinder 53 and piston 54 mounted on the tractor, the opposite ends of the power cylinder 53 communicating through conduits 55 and 56 to the opposite ends of a work cylinder 57 arranged adjacent the sprayer unit. The tower or mast 16 supporting plural spray units has the rocker arms 36' connected by a link 58 to the piston 59 of the cylinder 57. The piston rod 60 extending from piston 54 is pivotally connected to an actuating block 61 having a socket 63 with which the balled end 64 of the actuating lever 52 is engaged so that by rocking the lever back and forth to reciprocate the piston 54 the hydraulic transmission will impart like reciprocation to the piston 59 and the connected link 58. This will result in the up and down movement of the sprayer unit and, by reason of the rack and pinion cooperation, also a rotation of the sprayer head.

In the embodiment shown in Fig. 3, the vertical tower 16 may also be oscillated about its vertical axis and this will impart a horizontal swinging movement to the sprayer units. For accomplishing this, a crank arm 65 is fixed on the tower and is suitably connected to the piston rod 66 of the cylinder 67. The opposite ends of the work cylinder 67 are connected by conduits 68 and 69 to the opposite ends of a power cylinder 70. The cylinder 70 has its piston 71 pivotally connected to the actuating block 61 by means of the piston rod 72, and the line of reciprocation of the piston 71 is preferably disposed at right angles to the line of movement of the piston 54 whereby either piston may be reciprocated without affecting the companion piston, or by more or less of a diagonal movement of the block 61 both pistons may be actuated simultaneously to a greater or lesser extent. The block 61 may be slidably mounted on a supporting surface 73 to guide the same in its horizontal plane of movement, and the two cylinders 53 and 70 are pivotally secured to this surface so as to permit necessary oscillating movement, as indicated at 53' and 70'.

Figure 5:
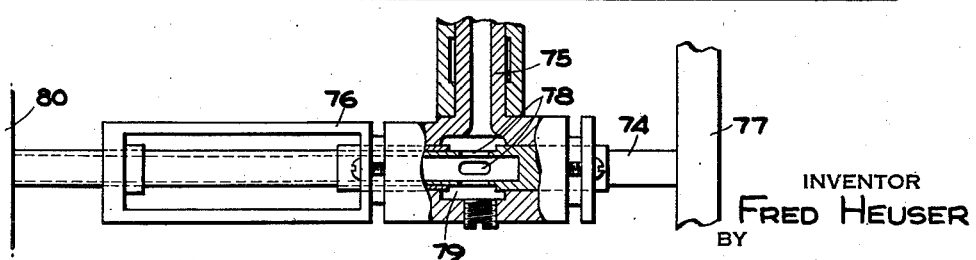
Fig. 5 is a fragmentary sectional view of another form of the invention.

In the modification illustrated in Fig. 5, the whirling action of the spray as well as the up and down movement is accomplished manually. For this purpose, the tubular shank 74 of the sprayer head 80 is extended through the hub portion 75 of the arm 76 to receive a hand wheel 77. The shank is provided with communicating openings 78 as it passes through the arm chamber 79 so that the spray liquid may properly flow to the nozzle. By bodily oscillating the wheel 77 up and down a like movement will be imparted to the sprayer head 80, and by rotating the wheel during this up and down movement the head will be likewise rotated to impart a whirling motion to the spray delivered by the head.

From the foregoing, it will be obvious that the spray delivered by the sprayer head will have a combined action in which the whirling motion will serve to turn the leaves and foliage in various directions so that the spray will more thoroughly penetrate the foliage and coat the tree for greater efficiency and effectiveness in the control of the insects and other pests encountered.

While the foregoing description has been given in detail, it is not intended thereby to restrict the invention since the inventive principles are capable of assuming other physical embodiments without departing from the spirit of the invention and the scope of the appended claims.

What is claimed is:

1. A spraying machine comprising a supporting structure, a sprayer unit mounted thereon for back and forth movement in a definite path, said sprayer unit having a sprayer arm, a lateral shaft carried by the arm and journaled in said supporting structure, a sprayer head having a shank rotatably disposed within said arm and laterally extending portions formed on said head, the axis of rotation of the shank extending substantially radial of the shaft, a spray nozzle carried by each portion and discharging in the direction of such axis, means for oscillating said unit, and gear means carried by said supporting structure and said head for rotating said unit during oscillation.

2. A spray machine comprising a supporting structure, a sprayer unit mounted thereon for back and forth movement in a definite path and carrying a sprayer head rotatable about an axis extending substantially in the direction of discharge of the spray from the head, a rack carried by the structure alongside the path of movement of the unit, and a gear member carried by the unit in meshing relation to the rack for rotating the head during such back and forth movement whereby to impart a swirling motion to the spray as it issues from the sprayer head during its back and forth movement.

3. A spray machine comprising a supporting structure, a sprayer unit mounted thereon for back and forth movement in a definite path and carrying a sprayer head rotatable about an axis extending substantially in the direction of discharge of the spray from the head, a rack carried by the structure alongside the path of movement of the unit, a gear member carried by the unit in meshing relation to the rack for rotating the head during such back and forth movement, and means for moving the unit back and forth whereby to cause the gear member to track upon the rack and rotate the head simultaneously therewith for imparting a whirling motion to the spray issuing from the traveling sprayer head.

4. A spray machine for trees and shrubs, comprising a sprayer unit mounted for back and forth movement and carrying an independently rotatable sprayer head rotatable about an axis extending transverse of the path of movement of the unit, said head having a discharge orifice off-center from the axis of rotation but discharging in the direction of axis extent, means for actuating the unit back and forth, means for rotating the sprayer head while the unit is being so actuated back and forth, whereby to produce an advancing motion to the spray for turning the leaves and smaller branches of a tree or shrub so as to expose the under side of the leaves and to open the interior of the foliage to the direct action of the spray, means mounting the sprayer unit with its actuating means for movement as an entirety back and forth in a direction laterally of the path of the first back and forth movement of the sprayer head and laterally of the direction of movement of the advancing whirling spray issuing therefrom, means for so actuating the entirety back and forth, and means common to both actuating means for selectably controlling their operation.

5. A spray apparatus including a support, a spray unit mounted on the support for movement in a path back and forth and having a spray nozzle rotatable about an axis crosswise of the path and issuing a spray substantially in the direction of extent of the axis for producing an advancing whirling spray, means operatively connected to the unit for imparting such movement thereto, means operable by and during the movement of the unit back and forth for imparting such whirling motion to the spray issuing therefrom, and means operable by said first means for adjusting the support in a path sidewise to the back and forth movement of the unit.

FRED HEUSER.

REFERENCES CITED

The following references are of record in the file of this patent:

UNITED STATES PATENTS

| Number | Name | Date |
|---|---|---|
| Re. 22,039 | Vaage | Feb. 24, 1942 |
| 384,699 | Lee | June 19, 1888 |
| 481,718 | Salisbury | Aug. 30, 1892 |
| 900,015 | Hill | Sept. 29, 1908 |
| 1,390,310 | Plumer | Sept. 13, 1921 |
| 1,501,718 | Olschewski | July 15, 1924 |
| 1,504,152 | Slack | Aug. 5, 1924 |
| 1,534,241 | Nichols | Apr. 21, 1925 |
| 1,580,478 | Fox et al. | Apr. 13, 1926 |
| 1,726,986 | Horten | Sept. 3, 1929 |
| 1,835,865 | Hansen | Dec. 8, 1931 |
| 1,900,837 | Mills | Mar. 7, 1933 |
| 2,030,934 | Persons | Feb. 18, 1936 |
| 2,039,768 | Bird | May 5, 1936 |
| 2,363,776 | Dale | Nov. 28, 1944 |
| 2,365,755 | Griffith | Dec. 26, 1944 |
| 2,367,135 | Moon et al. | Jan. 9, 1945 |
| 2,369,950 | Daly | Feb. 20, 1945 |